United States Patent
DeLuca et al.

(10) Patent No.: US 8,375,299 B2
(45) Date of Patent: Feb. 12, 2013

(54) PASTING CONTENT INTO A DOCUMENT USING TWISTIES

(75) Inventors: Lisa Seacat DeLuca, San Francisco, CA (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 12/613,975

(22) Filed: Nov. 6, 2009

(65) Prior Publication Data

US 2011/0113324 A1   May 12, 2011

(51) Int. Cl.
*G06F 17/00* (2006.01)

(52) U.S. Cl. .................................................... 715/255

(58) Field of Classification Search .................. 715/200, 715/255
See application file for complete search history.

(56) References Cited

U.S. PATENT DOCUMENTS

| | | | |
|---|---|---|---|
| 6,008,811 A | 12/1999 | McMillan | |
| 6,647,533 B1 | 11/2003 | Liu et al. | |
| 6,684,212 B1 * | 1/2004 | Day et al. | 1/1 |
| 6,915,254 B1 * | 7/2005 | Heinze et al. | 704/9 |
| 6,944,821 B1 | 9/2005 | Bates et al. | |
| 7,155,435 B1 * | 12/2006 | Day et al. | 715/751 |
| 7,743,317 B2 * | 6/2010 | Broman et al. | 715/217 |
| 2002/0107892 A1 * | 8/2002 | Chittu et al. | 707/514 |
| 2003/0065613 A1 | 4/2003 | Smith | 705/38 |
| 2004/0172584 A1 * | 9/2004 | Jones et al. | 715/500 |
| 2005/0149871 A1 * | 7/2005 | Broman et al. | 715/724 |
| 2005/0246283 A1 * | 11/2005 | Gwiazda et al. | 705/52 |
| 2006/0218492 A1 * | 9/2006 | Andrade | 715/523 |
| 2006/0294466 A1 * | 12/2006 | Muller et al. | 715/719 |
| 2007/0055926 A1 * | 3/2007 | Christiansen et al. | 715/512 |
| 2007/0061747 A1 | 3/2007 | Hahn et al. | |
| 2008/0040663 A1 | 2/2008 | Johnson et al. | |
| 2008/0193908 A1 * | 8/2008 | Wang et al. | 434/365 |
| 2009/0064001 A1 * | 3/2009 | Robbins | 715/762 |
| 2010/0122160 A1 * | 5/2010 | Chirakansakcharoen et al. | 715/256 |
| 2012/0072859 A1 * | 3/2012 | Wang et al. | 715/764 |

* cited by examiner

*Primary Examiner* — Cong-Lac Huynh
(74) *Attorney, Agent, or Firm* — Patterson & Sheridan, LLP (57) ABSTRACT

Systems, methods and articles of manufacture are disclosed for pasting text into a document as twisties. In one embodiment, a request may be received to paste text into a document. A plurality of twisties may be generated from the text. The plurality of twisties may be inserted into the document, responsive to the request to paste text into the document.

21 Claims, 6 Drawing Sheets

PASTING CONTENT INTO A DOCUMENT USING TWISTIES

BACKGROUND

1. Field of the Invention

Embodiments of the invention relate to creating and editing documents. More specifically, embodiments of the invention relate to techniques for pasting text into a document as twisties.

2. Description of the Related Art

E-mail and document systems often support collapsible sections, referred to as "twisties" within a document. A twistie refers to a section of content within a document. Each twistie includes a twistie heading, a twistie body, and a twistie icon. The twistie heading typically includes a brief description or summary of content in the twistie body. The twistie body includes content that is collapsible and expandable via the twistie icon. For example, a user may click on the twistie icon to collapse the section of content (if the section of content is expanded) or expand the section of content (if the section of content is collapsed). The twistie heading may remain visible regardless of whether the twistie body is collapsed or expanded. Further, a document may include a twistie group. Typically, only a single twistie of a twistie group may be expanded at any point in time. That is, if a first twistie of the twistie group is expanded, expanding a second twistie of the twistie group results in the first twistie of the twistie group being collapsed.

Documents often include twisties to hide optional information or to present the document to a user in a manner that reduces user confusion (e.g., resulting from a perception by the user of the document as being "cluttered"). Twisties may be used to hide detailed content in newsletters, web content, or e-mails summarizing news or items of interest. A user may expand a collapsed twistie to reveal content inside the twistie. Thus, twisties convey sections of content using less screen space (than if all of the sections of content are expanded).

SUMMARY

One embodiment of the invention includes a computer-implemented method. The method may generally include configuring one or more computer processors to perform an operation. The operation may generally include receiving a request to paste text into a document; segmenting the text into one or more sequential sections; generating a twistie for each segment, based on the text; and inserting the generated twisties into the document, responsive to the request to paste text into the document.

Another embodiment of the invention includes a computer-readable storage medium containing a program, which, when executed on a processor, performs an operation. The operation may generally include receiving a request to paste text into a document; segmenting the text into one or more sequential sections; generating a twistie for each segment, based on the text; and inserting the generated twisties into the document, responsive to the request to paste text into the document.

Still another embodiment includes a system having one or more computer processors and a memory containing a program, which when executed by the one or more computer processors is configured to perform an operation. The operation may generally include receiving a request to paste text into a document; segmenting the text into one or more sequential sections; generating a twistie for each segment, based on the text; and inserting the generated twisties into the document, responsive to the request to paste text into the document.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for pasting text into a document as twisties. One embodiment of the invention provides an application for editing documents. Examples of documents include web pages, word processing documents, e-mail, etc. The application may be a web page editor, a word processor, an e-mail client, etc. In one embodiment, the application may receive a request from a user to paste text from a clipboard. As is known, the clipboard refers to software functionality that is used for short-term data storage and/or data transfer between documents and/or applications via cut, copy, and/or paste operations. The clipboard may be provided by an operating system, window manager, or a third-party application.

The application may generate twisties from the text. The application may also insert the twisties into the document. Thus, the user need not create sections for each twistie, name each twistie, and copy text into each twistie. Instead, the user may merely specify that twisties are to be generated from text in the clipboard. Optionally, the user may also confirm that names generated for the twisties are desirable to the user. Further, the application may generate nested twisties (i.e., twisties contained within another twistie). Accordingly, the user may create twisties in the document more efficiently and conveniently.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
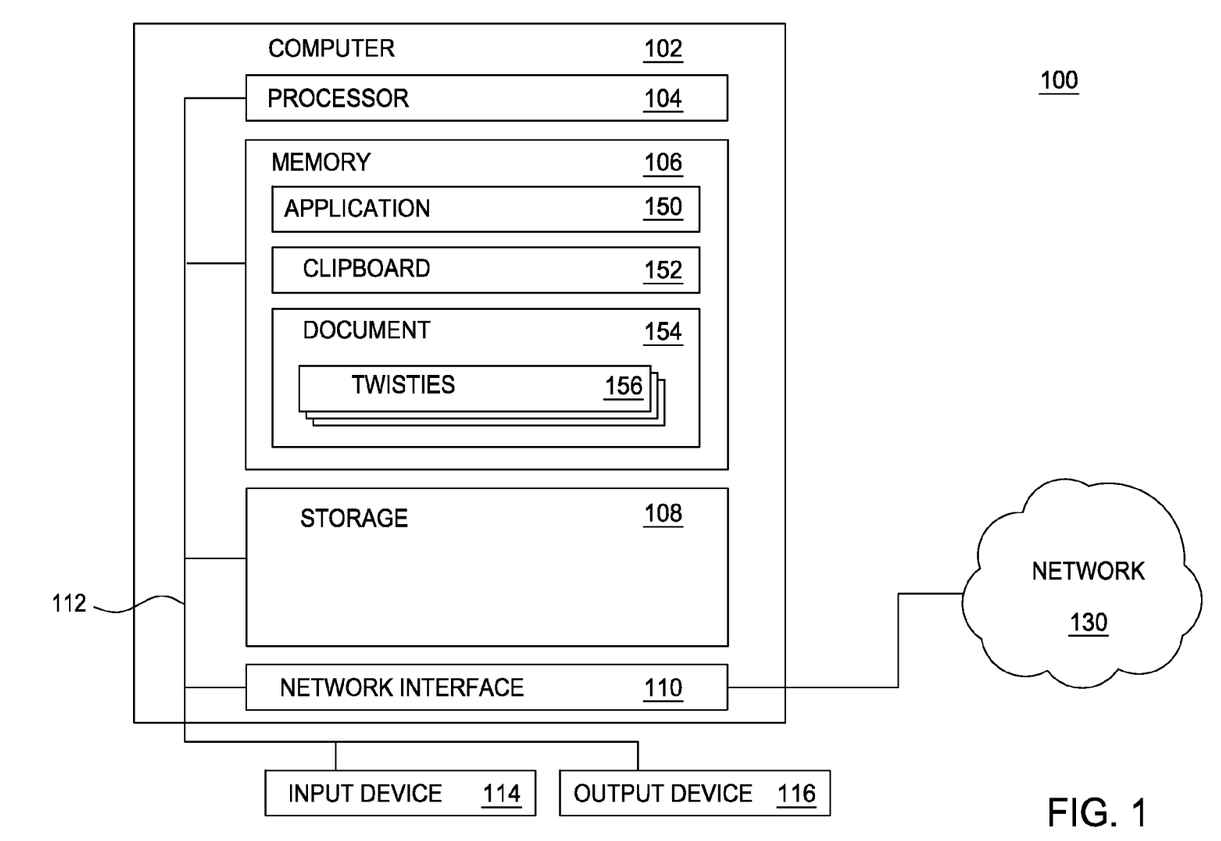
FIG. 1 is a block diagram illustrating a system for pasting text into a document as twisties, according to one embodiment of the invention.

FIG. 1 is a block diagram illustrating a system 100 for pasting text into a document as twisties, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150, a clipboard 152, and a document 154. The document includes twisties 156. As described above, the application 150 may be a Web browser, a word processor, an e-mail client, etc. The application may generate twisties from text pasted from the clipboard 152. As described above, a twistie refers to a section of content within a document that includes a twistie heading, a twistie body, and a twistie icon. The twistie heading may include a brief description or summary of content in the twistie body. The twistie body may include content that is collapsible and expandable via the twistie icon. Further, a document may include a twistie group. No more than one twistie of a twistie group may be expanded at any point in time.

Figure 2:
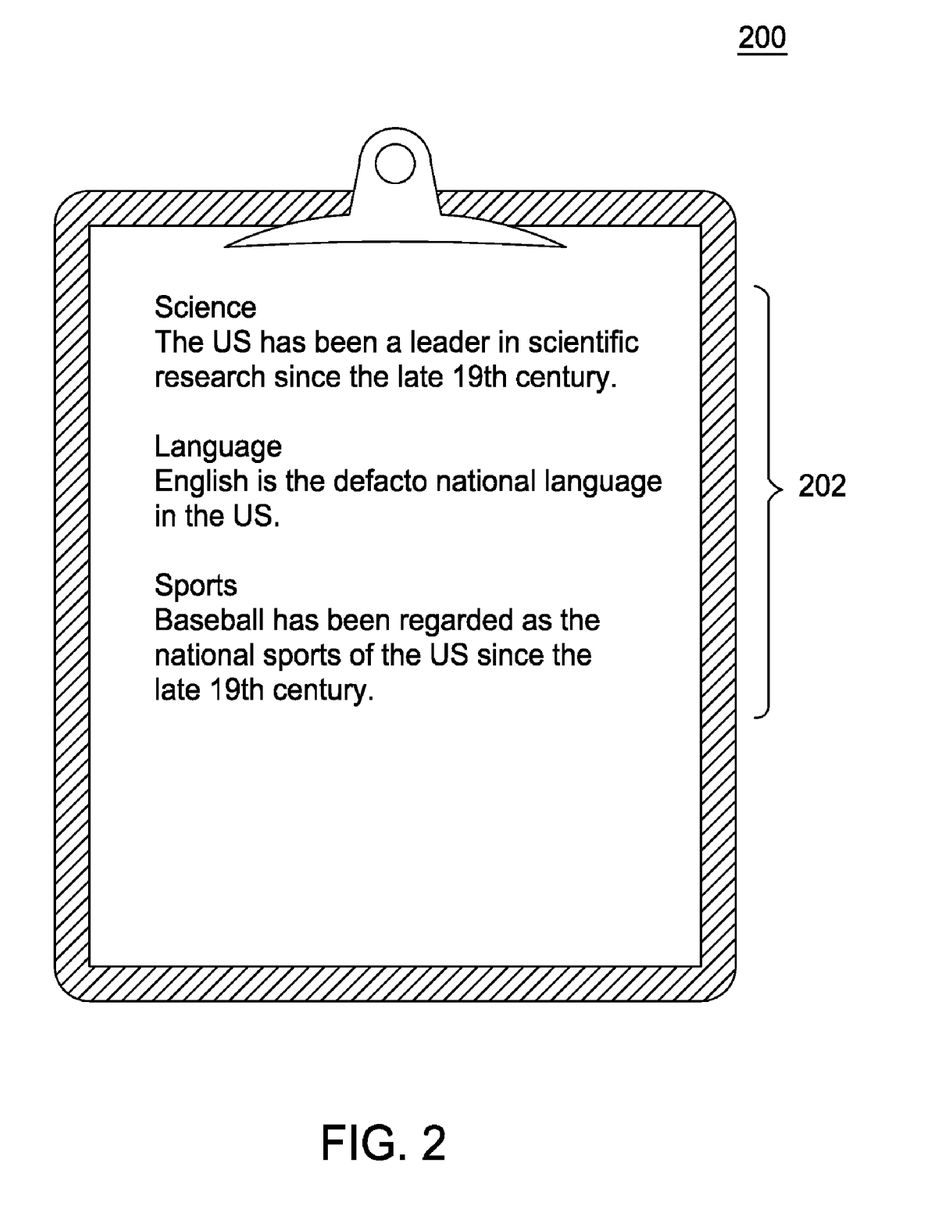
FIG. 2 illustrates a clipboard of the system, according to one embodiment of the invention.

As described above, the clipboard 152 refers to software functionality that is used for short-term data storage and/or data transfer between documents and/or applications via cut, copy, and/or paste operations. FIG. 2 illustrates a clipboard 200 of the system 100 of FIG. 1, according to one embodiment of the invention. As shown, the clipboard 200 includes text 202. The text 202 may have been copied from a document such as a Web page, a word processing document, an email, etc. And while embodiments herein are described with reference to twisties that are generated by a standalone application, other embodiments are broadly contemplated. For example, in one embodiment, the twisties may instead be generated by a clipboard manager (e.g., an operating system, a window manager, or a third party application, etc.).

Figure 3A:
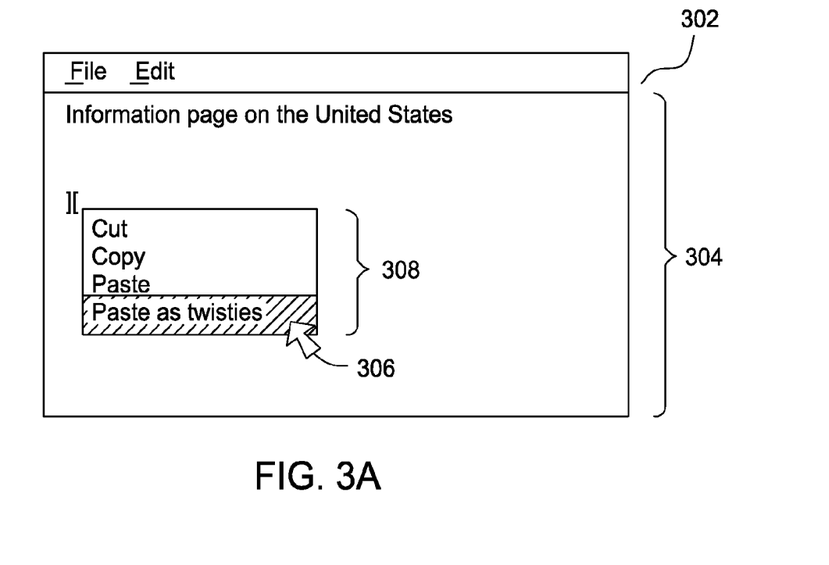
FIGS. 3A-3C illustrate graphical user interface (GUI) screens of an application for editing documents, according to one embodiment of the invention.
Figure 3B:
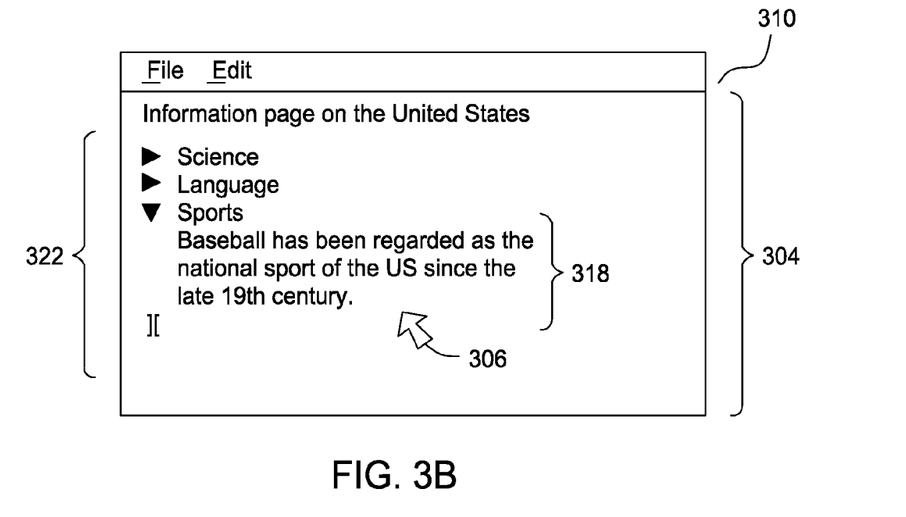
Figure 3C:
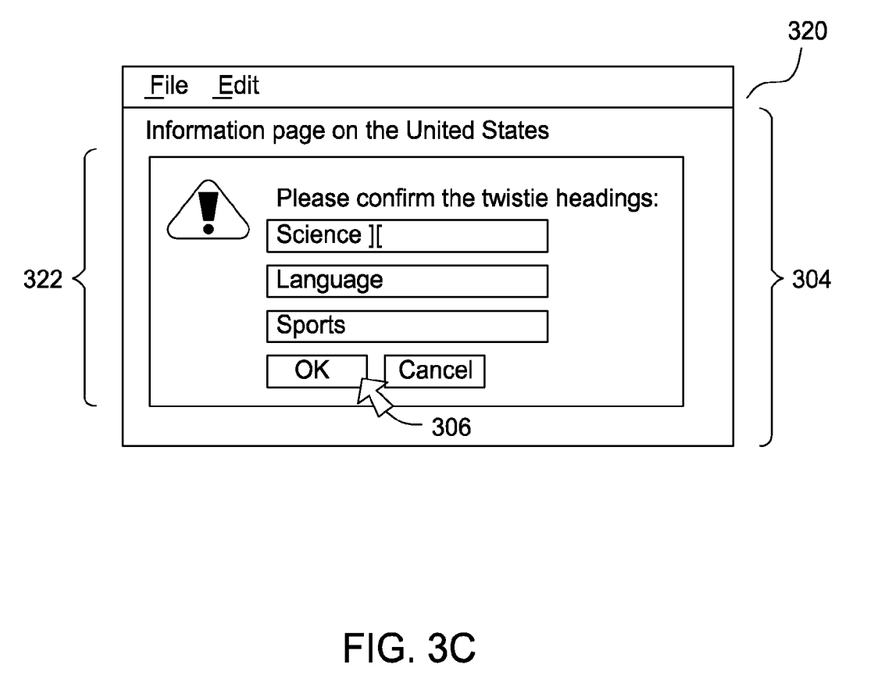

FIGS. 3A-3C illustrate graphical user interface (GUI) screens 302, 310, 320 of the application 150 of FIG. 1, according to one embodiment of the invention. As shown, the GUI screen 302 of FIG. 3A includes a document 304 and a pointer 306. In one embodiment, a user may request to paste text from the clipboard 200 into the document 304. For example, the user may right-click the document 304. In response, the application may display a menu 308. The menu 308 may present various commands to the user. For example, the commands may include cutting text, copying text, pasting text, and pasting text as twisties.

Suppose the user selects a command to paste text (from the clipboard) as twisties. In response, the application 150 may generate twisties from the text. Specifically, the application may provide a twistie icon for each twistie. Further, the application 150 may generate a twistie name for each twistie. Further still, the application 150 may generate a twistie body for each twistie. For example, the application 150 may generate twistie names and twistie bodies from parsing the text. The application 150 may analyze spacing and/or formatting of the text. That is, the application 150 may generate twistie names and twistie bodies from the way that the text is formatted and/or spaced. For example, the application 150 may generate a twistie name from bolded text in the clipboard. The application 150 may also generate a twistie name and/or twistie body from text that is spaced (e.g., several line breaks) apart from other text in the clipboard. The application may segment text from the clipboard into twistie bodies from the way that the text is spaced. In one embodiment, the application may segment text into one or more sequential sections of the text.

Of course, those skilled in the art will recognize that the manner in which the application 150 generates twistie names and twistie bodies from the way that the text in the clipboard is spaced and/or formatted may be tailored to suit the needs of a particular case. For example, suppose the clipboard includes the following Hypertext Markup Language (HTML)-formatted text:

TABLE I

| Clipboard text example |
|---|
| <ol>  <li>Coffee</li>  <li>Tea</li>  <li>Milk</li> </ol> |

In this particular example, the application 150 may generate a single twistie for the <ol> (ordered list) tag in the text. The user may click on a twistie icon of the single twistie to expand and/or collapse a twistie body (i.e., the ordered list) of the single twistie. As another example, suppose the clipboard includes the following HTML-formatted text:

TABLE II

| Clipboard text example |
|---|
| <ol>  <li>Coffee - Coffee continues to be one of the most popular drinks in the United States . . .</li>  <li>Tea - Tea drinking has been embraced by many as a healthy . . .</li>  <li>Milk - Milk has long been a staple of an American breakfast, especially for young children . . .</li> </ol> |

In this particular example, the application 150 may generate a twistie for each <li> (list item) tag in the text. For example, the application 150 may generate twisties corresponding to Coffee, Tea, and Milk, respectively. The user may click on a twistie icon of one of the twisties to expand a corresponding twistie body (e.g., "Coffee continues to be one of the most popular drinks in the United States . . . ").

Unlike the previous example in which the entire ordered list may be expanded or collapsed, individual items in the list may be expanded or collapsed in this example. For instance, the application 150 may determine if an average number of words per <li> tag in an ordered list exceeds a predefined threshold. If so, the application 150 may generate a twistie for each <li> tag. Otherwise, there may not be a sufficient number of words for which to warrant generating a twistie for each <li> tag (e.g., the clipboard text example of Table I). Thus, the application 150 may generate a single twistie for the ordered list overall. In one embodiment, in the case of HTML markup like the examples of Table I and II, a twistie may be defined using cascading style sheets (CSS) to provide twistie like behavior. For example, where a following div may initially be hidden (style="display:none") and when a click action is taken the style changes to display="inline".

In one embodiment, the application 150 may generate nested twisties. For example, the application 150 may generate a single twistie for the <ol> (ordered list) tag of Table II. The application 150 may then generate a twistie (nested inside of the single twistie for the <ol> tag) for each <li> (list item) tag in the text. In one embodiment, the user may configure whether the application should generate nested twisties (and/or at most how many levels of nesting are desired).

Once the application 150 generates the twisties, the application 150 may insert the twisties into the document. For example, FIG. 3B illustrates the GUI screen 310. The GUI screen includes the document 304 and the pointer icon 306. The document 304 includes twisties 312 generated and inserted by the application 150. In this particular example, the application 150 generates three twisties. The three twisties include twistie headings of "Science," "Language," and "Sports." Besides including a twistie heading, each twistie also includes a twistie icon and a twistie body. For example, the "Sports" twistie includes a twistie icon 314, a twistie heading 316, and a twistie body 318. The twistie body 318 includes, "Baseball has been regarded as the national sport of the US since the late 19th century." Accordingly, the user may create twisties in the document merely via issuing a command to "paste text as twisties." In other words, the user need not create three twisties, name each of the created twisties, and paste content into each of the created twisties. Thus, the user may create twisties more efficiently and conveniently.

In one embodiment, the application 150 may also prompt the user to confirm twistie headings. For example, FIG. 3C illustrates the GUI screen 320. The GUI screen 320 includes the document 304 and a prompt box 322. The prompt box asks the user to confirm twistie headings generated (from clipboard text) by the application 150. The user may review and/or modify the twistie headings in the prompt box. The user may also confirm the twistie headings or cancel creating twisties altogether. If the user confirms the twistie headings, the application 150 inserts the generated twisties into the document 304. If the user cancels creating twisties, the application 150 does not insert any generated twisties into the document 304.

Figure 4:
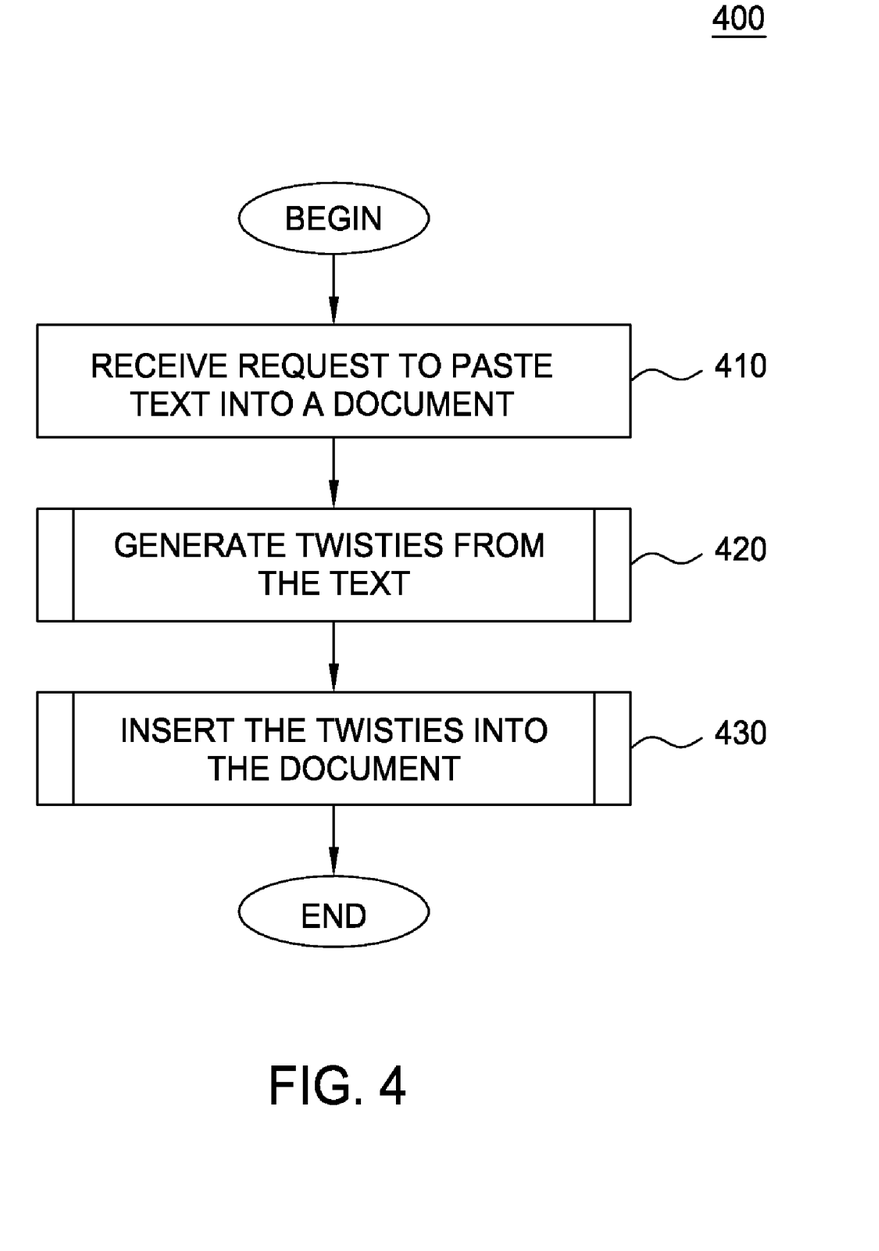
FIG. 4 is a flowchart depicting a method for pasting text into a document as twisties, according to one embodiment of the invention.

FIG. 4 is a flowchart depicting a method 400 for pasting text into a document as twisties, according to one embodiment of the invention. As shown, the method 400 begins at step 410, where the application 150 receives a request to paste text from the clipboard 152 into the document 154. For example, the user may issue a command to "paste text as twisties" into a word processing document. At step 420, the application 150 generates twisties 156 from the text. For example, the application 150 may generate twistie names and twistie bodies from the way the text is spaced and/or formatted. At step 430, the application 150 inserts the generated twisties 156 into the document 154. After the step 430, the method 400 terminates.

Figure 5:
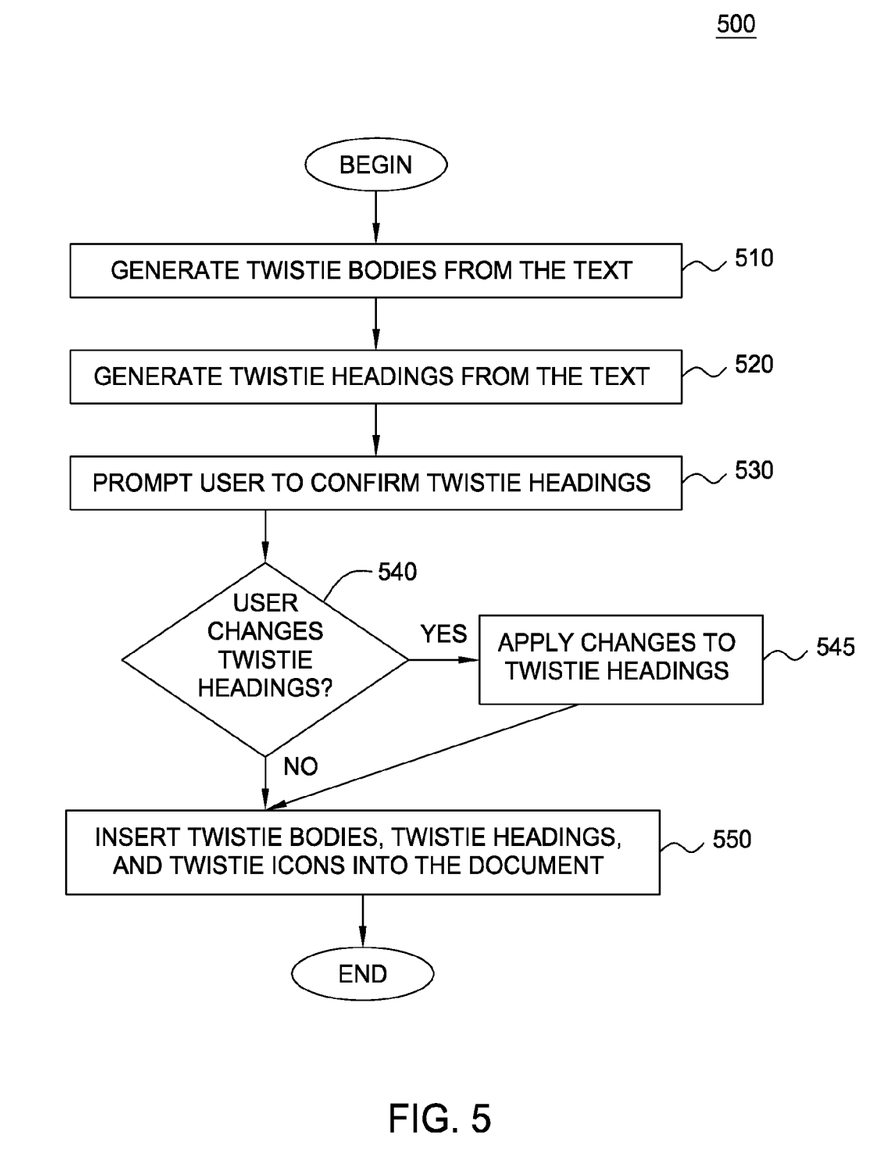
FIG. 5 is a flowchart depicting a method for generating twisties from text, according to one embodiment of the invention.

FIG. 5 is a flowchart depicting a method 500 for generating twisties from text, according to one embodiment of the invention. The method 500 corresponds to the steps 420 and 430 of FIG. 4. As shown, the method 500 begins at step 510, where the application 150 generates twistie bodies from the text. For example, the application 150 may generate a twistie body "English is the de facto national language in the US" from the clipboard 202 of FIG. 2. At step 520, the application 150 generates twistie headings from the text. For example, the application 150 may generate a twistie heading "Language" from the clipboard 202 of FIG. 2.

At step 530, the application 150 prompts the user to confirm the twistie headings. At step 540, the application 150 determines whether the user has changed the twistie headings. If so, the application applies the changes to the twistie headings (step 545). The application 150 then inserts (for each twistie) a twistie body, a twistie heading, and a twistie icon into the document 154 (step 550). After the step 550, the method 500 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for pasting text into a document as twisties. One embodiment of the invention provides an application for editing documents. In one embodiment, the application receives a request to paste text from a clipboard into a document. The application may generate twisties from the way the text is spaced and/or formatted. Each twistie may include a twistie icon, a twistie heading, and a twistie body. The application may insert the generated twisties into the document. Thus, the user need not create sections for each twistie, name each twistie, and copy text into each twistie. Instead, the user may merely specify that twisties are to be generated from text in the clipboard. Accordingly, the user may create twisties in the document more efficiently and conveniently.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving a request to paste text into a document;
   segmenting the text into sequential sections;
   generating a twistie for each section of the sequential sections, based on the text and by operation of one or more computer processors;
   prompting for confirmation of twistie headings of the generated twisties; and
   upon receiving confirmation of the twistie headings, inserting the generated twisties into the document, responsive to the request to paste text into the document.

2. The computer-implemented method of claim 1, wherein each twistie includes a twistie heading, a twistie body, and a twistie icon for collapsing and expanding the twistie body.

3. The computer-implemented method of claim 1, wherein segmenting the text comprises:

analyzing characteristics of the text to segment the text into twistie bodies of the twisties.

4. The computer-implemented method of claim 3, wherein the characteristics of the text are selected from at least one of text spacing and text formatting.

5. The computer-implemented method of claim 1, wherein generating the twisties from the text comprises, prior to prompting for confirmation of the twistie headings:
generating the twistie heading for each of the twisties.

6. The computer-implemented method of claim 5, wherein the twistie heading for each of the twisties is generated from a corresponding twistie body.

7. The computer-implemented method of claim 1, wherein at least one of the generated twisties includes a nested twistie.

8. A computer-readable storage medium containing a program, which, when executed, performs an operation comprising:
receiving a request to paste text into a document;
segmenting the text into sequential sections;
generating a twistie for each section of the sequential sections, based on the text and by operation of one or more computer processors when executing the program;
prompting for confirmation of twistie headings of the generated twisties; and
upon receiving confirmation of the twistie headings, inserting the generated twisties into the document, responsive to the request to paste text into the document.

9. The computer-readable storage medium of claim 8, wherein each twistie includes a twistie heading, a twistie body, and a twistie icon for collapsing and expanding the twistie body.

10. The computer-readable storage medium of claim 8, wherein segmenting the text comprises:
analyzing characteristics of the text to segment the text into twistie bodies of the twisties.

11. The computer-readable storage medium of claim 10, wherein the characteristics of the text are selected from at least one of text spacing and text formatting.

12. The computer-readable storage medium of claim 8, wherein generating the twisties from the text comprises, prior to prompting for confirmation of the twistie headings:
generating the twistie heading for each of the twisties.

13. The computer-readable storage medium of claim 12, wherein the twistie heading for each of the twisties is generated from a corresponding twistie body.

14. The computer-readable storage medium of claim 8, wherein at least one of the generated twisties includes a nested twistie.

15. A system, comprising:
one or more computer processors; and
a memory containing a program, which when executed by the one or more computer processors is configured to perform an operation comprising:
receiving a request to paste text into a document;
segmenting the text into sequential sections;
generating a twistie for each section of the sequential sections, based on the text;
prompting for confirmation of twistie headings of the generated twisties; and
upon receiving confirmation of the twistie headings, inserting the generated twisties into the document, responsive to the request to paste text into the document.

16. The system of claim 15, wherein each twistie includes a twistie heading, a twistie body, and a twistie icon for collapsing and expanding the twistie body.

17. The system of claim 15, wherein segmenting the text comprises:
analyzing characteristics of the text to segment the text into twistie bodies of the twisties.

18. The system of claim 17, wherein the characteristics of the text are selected from at least one of text spacing and text formatting.

19. The system of claim 15, wherein generating the twisties from the text comprises, prior to prompting for confirmation of the twistie headings:
generating the twistie heading for each of the twisties.

20. The system of claim 19, wherein the twistie heading for each of the twisties is generated from a corresponding twistie body.

21. The system of claim 15, wherein at least one of the generated twisties includes a nested twistie.

* * * * *